Figure 1:
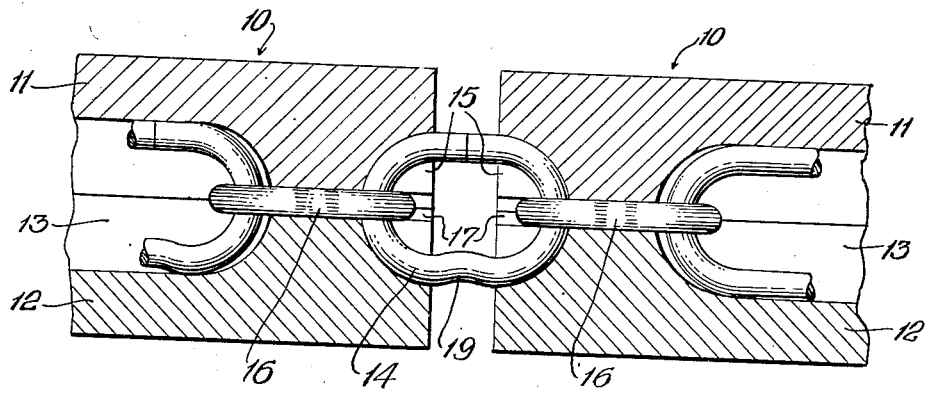

July 11, 1950     H. F. DOUGHERTY     2,514,444
METHOD OF RESISTANCE WELDING CHAIN LINKS
Filed May 23, 1946

INVENTOR.
HARRY F. DOUGHERTY
BY
ATTORNEY

Patented July 11, 1950

2,514,444

UNITED STATES PATENT OFFICE 2,514,444

METHOD OF RESISTANCE WELDING CHAIN LINKS

Harry F. Dougherty, York, Pa., assignor to American Chain & Cable Company, Inc., Bridgeport, Conn., a corporation of New York Application May 23, 1946, Serial No. 671,748

2 Claims. (Cl. 219—10)

This invention relates to welding, and more particularly to resistance welding of links for chains and the like.

The resistance welding of various materials has been found to be best carried out with a definite welding pressure. Machines have been devised which produce a definite controllable pressure on the advancing mechanism which forces the ends to be welded together against each other with a definite force. In the welding of links or rings which have a single joint, the temper of the material of which the link is formed influences the pressure which is actually exerted on the surfaces to be welded. Variation in the temper or stiffness of the material thus results in a varying effective welding pressure. Also, the resistance which the link offers to the deformation necessary to cause the weld is dependent upon the exact shape of the link. This is due to the action of the unwelded portion of the link acting as a column and as a bent beam.

Another difficulty which appears in certain types of resistance welding is the stress built up in the link, which tends to pull the weld apart. This stress is ordinarily not sufficient to actually break the weld and can, to a large extent, be removed by subsequent heat treatment. This stress is undesirable, however, and should be prevented if possible. In the welding of brass and alloy steel, for example, it is necessary to hold the weld together by stopping the machine after the weld has been completed until the material actually sets enough so that the elasticity of the unwelded part of the link does not pull the weld apart. This cuts down on the number of pieces which can be welded in any given time interval.

It is, therefore, a primary object of the present invention to produce a method of welding which gives a fully controllable welding pressure in the welding of links and rings.

It is a further object of the present invention to provide a welding method which introduces less stresses in the link to be removed.

It is a further object of the present invention to provide a welding method which does not require an excessive cooling time in the welding fixture.

Figure 2:
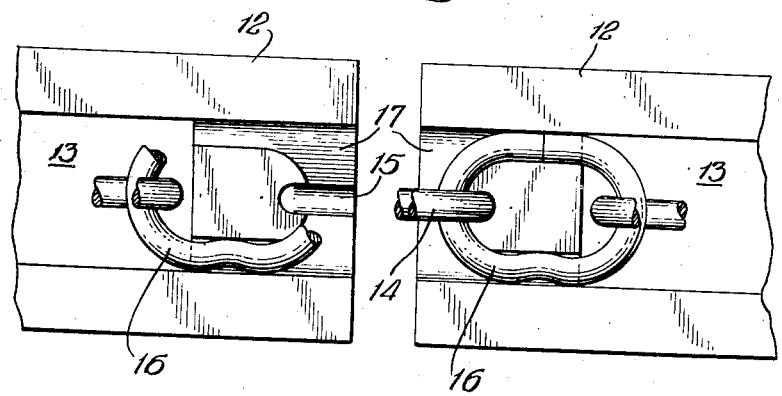

Referring now to the drawings:

Fig. 1 is a section taken through the center of the electrodes utilized in the present invention, and Fig. 2 is a plan view of Fig. 1, with the upper block of each electrode removed and the chain broken away in parts.

The electrodes shown in the drawings as illustrative of the present invention are designed for the welding of links forming a chain. The method employed consists of bending the links to proper shape for welding and then feeding the chain through the welding device. It is therefore necessary to shape the electrodes to permit passage of a chain through them. This has been done in the shown electrodes by dividing each electrode 10 into an upper block 11 and a lower block 12. Through the center of each electrode there extends an opening 13 which is of a size sufficient to clear the chain leading to and from the link being welded. The link 14 being welded is shown as being seated in a semi-circular recess 15 in each electrode 10. This seat extends entirely around the semi-circular end of the link. As shown in Fig. 2, the recess is also shaped so that it closely engages the stock of which the link is made, thus providing a uniform contact throughout the outside end of the link.

The links 16, which are next adjacent the link 14 being welded, are taken care of by the provision of recesses 17 cut in the lower surface of the block 11 and the upper surface of the block 12. In order to provide a sufficiency of electrode material in back of the link being welded, the links 16 have been shown as occupying the position which they occupy when the chain hangs free.

The mechanical movements which operate the welder open the electrodes by separating blocks 11 and 12 and advance the chain from the newly welded link to the next link lying in the same plane. Thus, it can be seen that the machine will weld every alternate link, which is common in many chain welding machines. After the alternate links have been welded, the chain may be turned around through 90° and the intermediate links welded, thus completing the chain. It is to be understood, of course, that it is perfectly feasible to weld successive links, rotating the chain ninety degrees for each link.

The mechanism for actually performing the welding consists of some mechanism which will advance the electrodes towards each other and pass a current through the link. The welding technique which has been found most suitable for a machine made as described is one which exerts a definite welding pressure on the link while simultaneously passing current through the link until the electrodes advance towards each other a certain definite distance, upon which the current is shut off by mechanism responsive to this motion. The advance continues until the electrodes have gone far enough to complete the weld. For producing a definite pressure any suitable mechanism may be used, such as a pneumatic or hydraullic device or mechanical advancing means for one electrode with hydraulic, pneumatic or even spring means on either or both electrodes yielding under pressure, and thus maintaining the actual force between the two electrodes at a given value.

The shape of the recesses 15 which receive the link being welded differs from that in conventional machines in that it permits the passage of considerable current through the back 19 of the link. Under welding pressure there will be no appreciable motion of the butted ends of the link together until the back 19 of the link becomes softened. This softening of the back of the link is accompanied by an increase in the temperature immediately adjacent the butted ends of the open side of the link.

It can be seen from the shape of the link that the softening of the back 19 of the link would not permit advance of the butted ends of the link until the butted portion is heated to a high enough temperature to yield under the welding pressure. As a practical matter, the softening of the back of the link renders it so flexible that any influence it may have upon the actual welding pressure developed at the weld is inconsequential. Even this inconsequential influence is rendered more uniform from link to link as any hardness in the link material is destroyed by heating the back. Under the influence of the force pushing the electrodes together, the ends are forced together and the weld completed. As can be seen from the figures, the back of the link is not upset to any appreciable extent; on the contrary, the deformation of the back of the link consists of an almost pure bending. This is because the semi-circular ends of the link are free to slide in corresponding semi-circular recesses in the electrode and thus the resultant force exerted by the electrodes on the link can be considered (excluding friction) as a single force acting at the center of each end of the link. This force is not sufficient to upset the back of the link, because, although it is plastic, it is by no means as soft as the material in the region which is to be welded. It has been found practicable to provide a reverse bend at 19, which becomes straightened out as the welded portion upsets. The link formed is then approximately straight on both sides with a slight upset at the weld. The entire chain may then be heat-treated to refine the grain in the weld, if desired.

It will be understood that the electrodes need not actually extend entirely around the end of the link—i. e., they may actually embrace only an arcuate portion of each end of the link. Also, the electrode need not extend the same distance around the end of the link on each side. The exact position where the welded side of the link enters the electrode and where the solid side of the link enters the electrode can be determined by experiment, and set to cause the proper heating of the back of the link when the butted side of the link reaches welding heat. However, the position does not appear to be overly critical, and the shown construction works very well. It is necessary in the practice of this invention to provide electrodes which are designed to cause a definite heating of the back of the link and which permit sliding of the link around the arcuate recess in the electrode, in contradistinction to prior machines which clamp the link rigidly, or else do not heat the back of the link.

It is to be understood that the above description is not intended to be limitative of the present invention and that other forms may be devised within the purview of the present claims; for instance, it is not strictly necessary that the chain pass through the electrodes as shown. If the chain links are long, the links adjacent that being welded may well hang between the electrodes. In that case the machine would be simpler for it would not be necessary to provide an electrode opening mechanism, but simply a mechanism to advance the electrodes and retract them, and another mechanism to present alternate links to the space between the electrodes.

It will therefore be seen that the above description is intended to be illustrative, and not limitative, and that many variations in both the structure and the method of manufacture may be practised without departure from the scope of this invention, which is best apprehended by reference to the appended claims.

I claim:

1. The method of welding a side of a metallic chain link having semicircular ends and connecting sides, comprising supporting the link in electrodes having recesses substantially encircling the semicircular ends of the link and formed to permit rotation of the ends of the link in the plane of the link, said recesses being also formed to minimize the current flowing through the semicircular ends of the link upon creation of a potential difference between the electrodes, creating a potential difference between the electrodes to cause a current to pass through the sides of the link, and urging the electrodes relatively toward each other.

2. The method of welding a side of a metallic chain link having other links concatenated therewith, said link having semicircular ends and straight connecting sides, comprising supporting the link being welded in electrodes having recesses each formed to substantially encircle the semicircular end of the link and clearing the straight sides of the link to permit rotation of the link end in the plane of the link, said electrodes also having recesses to support the adjacent links substantially along the axis of the link being welded, creating a potential difference between the electrodes, and urging said electrodes toward each other.

HARRY F. DOUGHERTY.

REFERENCES CITED

The following references are of record in the file of this patent:

UNITED STATES PATENTS

| Number | Name | Date |
|---|---|---|
| 778,269 | Rietzel | Dec. 27, 1904 |
| 783,543 | Rietzel | Feb. 28, 1905 |
| 1,948,349 | Hall | Feb. 20, 1934 |
| 2,301,173 | Blum et al. | Nov. 10, 1942 |
| 2,354,983 | Blum et al. | Aug. 1, 1944 |

FOREIGN PATENTS

| Number | Country | Date |
|---|---|---|
| 324,569 | Germany | Aug. 31, 1920 |